INVENTOR.
WILLIE M. SHOFFNER
BY Toulmin & Toulmin
ATTORNEYS

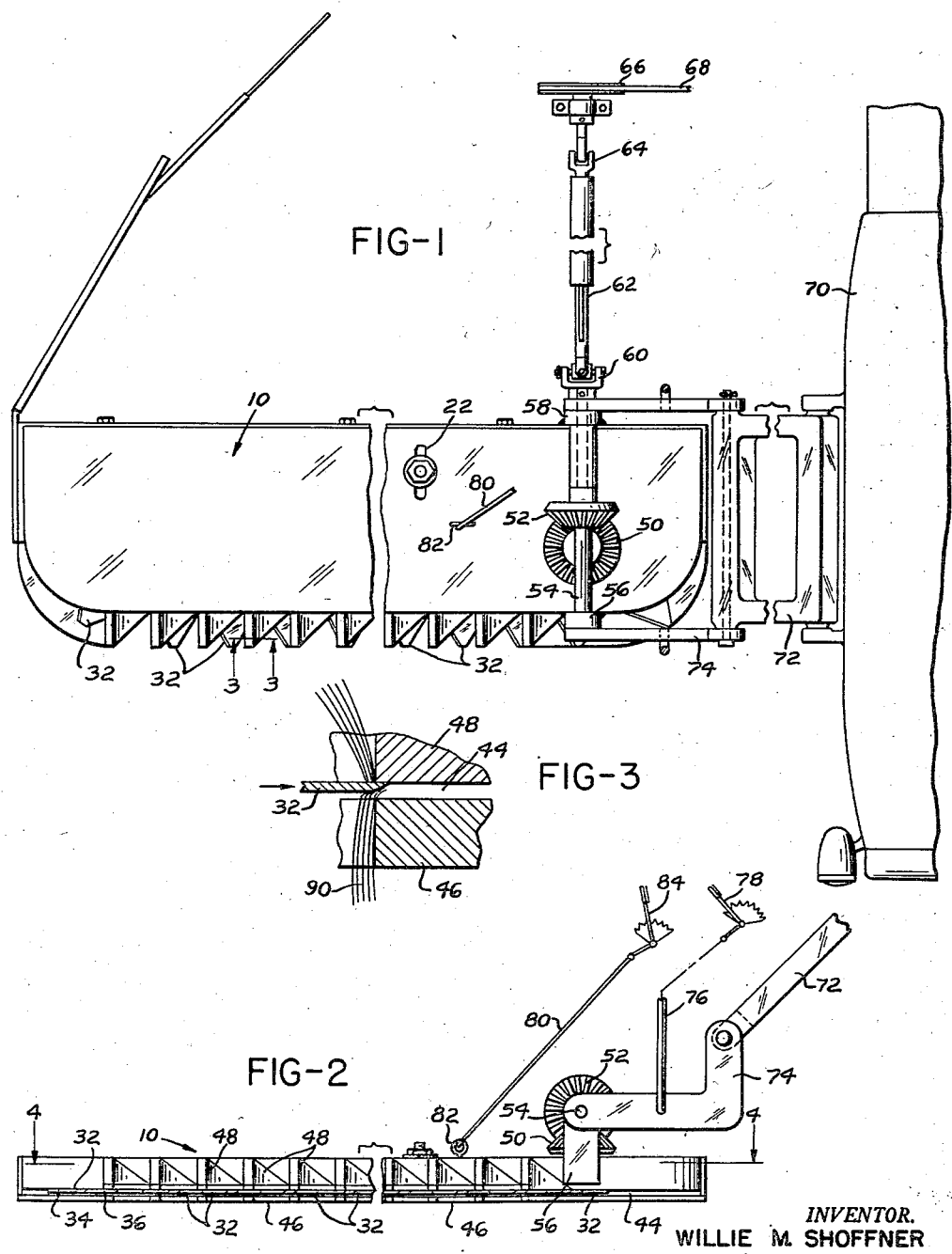
Jan. 28, 1958
W. M. SHOFFNER
2,821,060
ENDLESS CUTTING ASSEMBLY WITH UPPER AND LOWER CUTTER GUARD MEANS
Filed Nov. 24, 1954
3 Sheets-Sheet 1
INVENTOR.
WILLIE M. SHOFFNER
BY Toulmin & Toulmin
ATTORNEYS Jan. 28, 1958 W. M. SHOFFNER 2,821,060
ENDLESS CUTTING ASSEMBLY WITH UPPER
AND LOWER CUTTER GUARD MEANS
Filed Nov. 24, 1954 3 Sheets-Sheet 2
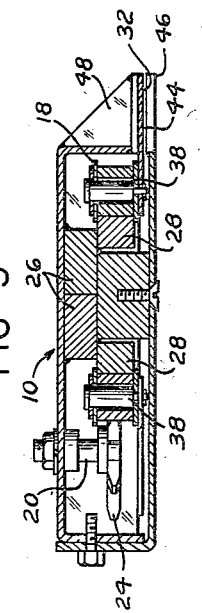
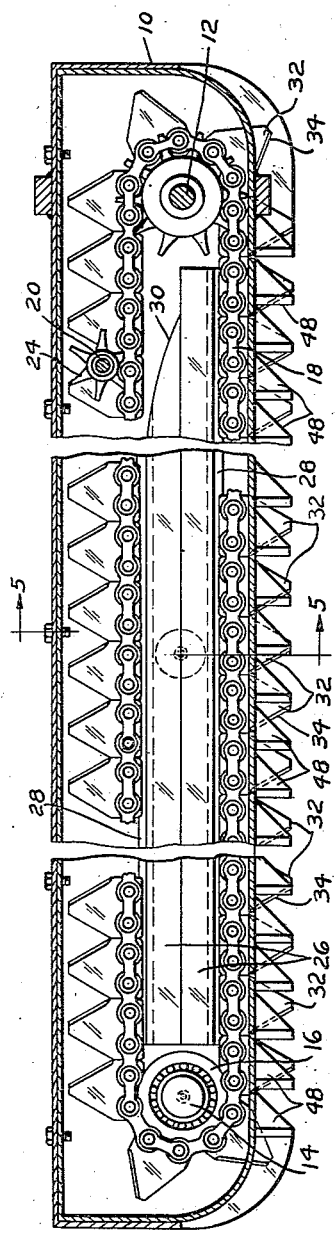
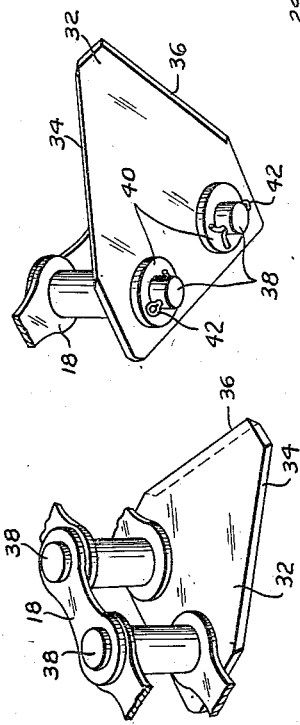
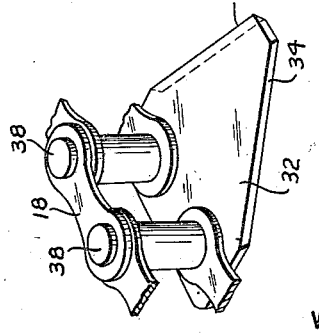
INVENTOR.
WILLIE M. SHOFFNER
BY Toulmin & Toulmin
ATTORNEYS Jan. 28, 1958 W. M. SHOFFNER 2,821,060
ENDLESS CUTTING ASSEMBLY WITH UPPER
AND LOWER CUTTER GUARD MEANS
Filed Nov. 24, 1954 3 Sheets-Sheet 3

United States Patent Office 2,821,060
Patented Jan. 28, 1958

2,821,060

ENDLESS CUTTING ASSEMBLY WITH UPPER AND LOWER CUTTER GUARD MEANS

Willie M. Shoffner, Dayton, Ohio, assignor to Roto-Table Co., Dayton, Ohio, a corporation of Ohio Application November 24, 1954, Serial No. 470,910

7 Claims. (Cl. 56—292)

This invention relates to a method and apparatus for mowing, and particularly to an apparatus adapted for tractor mounting. Substantially all conventional mowers of any substantial size are of the reciprocating sickle bar type, and this type of mower is characterized by having a pitman or drag link which connects the sickle bar with a rotating crank. This arrangement is generally satisfactory for actuating the mower, but has certain disadvantages that become more and more apparent as the speed of operation is increased, as is the case when the mower is tractor mounted. These disadvantages center about the reciprocation of the sickle bar and the actuation thereof by the pitman or drag link.

Since the sickle bar is reciprocated it is apparent that it will come to a complete halt at each end of its travel, and then be accelerated up to full speed during its travel toward its other halted position. This continuous acceleration of the sickle bar introduces vibrations that are extremely difficult to balance out when the mower is being operated at high speed. Further, the optimum moving conditions cannot be realized at all times because of the varying speed of the sickle bar.

The conventional mowing arrangement having a sickle bar is also characterized by a somewhat less obvious drawback which comes about because the blades of the sickle bar are arranged to cut at their lower edges and are shielded by a covering element underlying the sickle bar in spaced relation thereto.

This arrangement leads to the loading up of the sickle bar with cut vegetation so that, in heavy grasses or the like, it is often necessary to stop the conventional mower and clean out the accumulated grasses from between the sickle bar and the guard members that are located over the blades thereof.

The primary object of the present invention is to provide a mowing arrangement which overcomes the drawbacks referred to above that appear in conventional mowers.

Another object of the present invention is the provision of a mower especially adapted for tractor mounting which can be operated at extremely high speed without causing the mower to vibrate.

A further object of the present invention is the provision of a mowing arrangement which does not tend to become clogged or loaded up with the vegetation which is cut by the mower.

A still further object of the present invention is the provision of a mower that can be made practically any size and which is easily reparable and which can be kept in good operating condition in a relatively simple manner.

In brief, the objectives of this invention are attained by supporting a chain somewhat in the manner of a chain saw, with cutting elements carried by the chain and projecting outwardly therefrom. The chain is enclosed in a housing except that the cutting elements extend from the housing on one side, and which housing is provided with teeth that cooperate with the cutting elements to shear off vegetation between the teeth and the cutting elements.

A characteristic of the arrangement of the present invention is that the cutting elements are arranged to cut at their upper edges so that there is no tendency for the cut-off vegetation to be dragged beneath the teeth thus causing the mower to operate in a faulty manner.

Also, with the chain operating continuously in the same direction anything that becomes lodged between the elements and the teeth with which they cooperate will be dislodged very quickly in the normal course of operation of the mowing device so that the mower is self-cleaning.

The several objects and advantages of this invention will become more apparent upon reference to the following specification, taken in connection with the accompanying drawings, in which:

Figure 1 is a fragmentary plan view showing a mowing arrangement according to the present invention mounted on a tractor;

Figure 2 is a fragmentary front elevational view of the mower with the adjustments for raising and lowering and tilting the mower being diagrammatically illustrated;

Figure 3 is an enlarged fragmentary sectional view indicated by line 3—3 on Figure 1 showing the cutting action of the mower according to the present invention;

Figure 4 is a fragmentary sectional view indicated by line 4—4 on Figure 2;

Figure 5 is an enlarged transverse section indicated by line 5—5 on Figure 4;

Figures 6 and 7 are enlarged top and bottom perspective views, respectively, of a portion of the chain showing a cutting element attached thereto.

Figure 8:
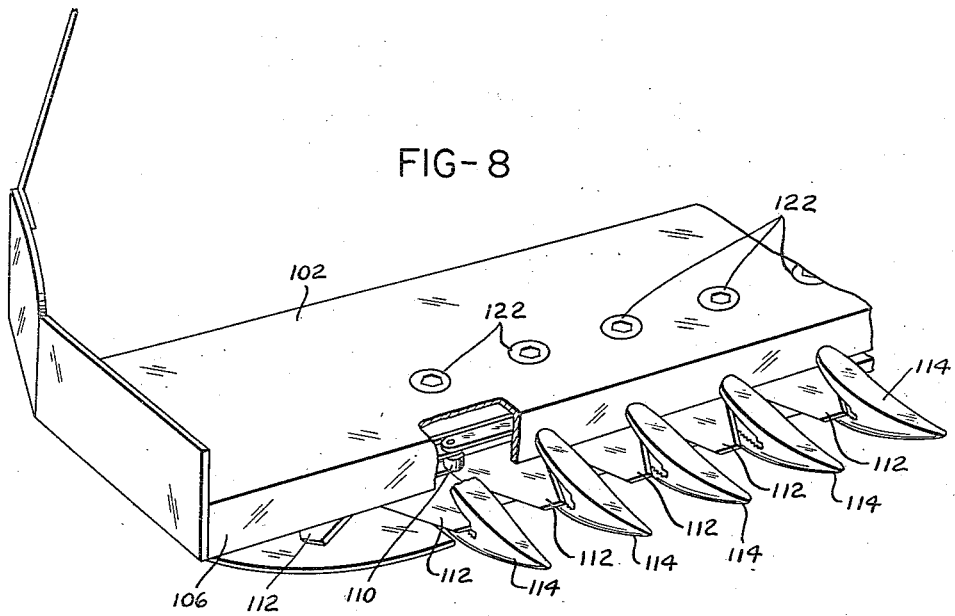
Figure 8 is a fragmentary perspective view with parts broken away and shown in section showing a modified construction according to my invention.

Referring to the drawings somewhat in more detail, Figures 1, 2 and 3 will reveal that the mower according to the present invention comprises a housing 10 of any suitable construction, within which there is provided at the right end (Figure 4) a drive shaft 12 preferably supported in both the top and bottom walls of the housing. At the left end of the housing is a shaft 14 which supports an idler 16 in the form of a sprocket, comprising an antifriction bearing, as indicated in Figure 4. There is provided a shaft 20 carried in a slot 22 in the top wall of the housing, and which shaft supports an idler sprocket 24. Sprocket 24 can be adjusted by movement of shaft 20 in slot 22 to maintain chain 18 properly taut.

As will be seen in Figures 4 and 5, housing 10 is provided internally thereof, as, for example, on the inside of the top thereof, with a pair of bars 26 extending lengthwise of the housing, and to the undersides of which are attached the bars 28 that serve as guides for the chain 18.

Toward the rear of housing 10 the bar 28 and, if necessary, the bar 26 to which it is attached are beveled or curved as at 30 to permit adjustment of sprocket 24 while insuring that the chain 18 will properly engage the bar 28.

Attached to the underside of chain 18 is a plurality of cutting elements 32 generally triangular in configuration and having their opposite sides beveled off as at 34 and 36 (Figures 6 and 7) to form cutting edges. Each cutting element is provided with apertures for receiving the pins 38 carried by the chain and to which the cutting elements are attached by the washers 40 and cotter keys 42.

As will be particularly observed in Figures 4 and 5, the location of the bars 28 within the housing 10 of the mower is such that the cutting elements project forwardly out of the front edge of the casing through a slot 44 formed therein. Also projecting forwardly from the front side of the casing of the mower, and fixedly attached to the said casing, are the plates 46 beneath the cutting elements and the members 48 located above the cutting elements. Plates 46 are generally triangular in plan with one edge substantially perpendicular to the length of the housing, and the other edge inclined thereto at an angle.

The members 48 are generally of the same configuration in plan and in front elevation (Figure 2) will be seen to have their one sides also inclined. Members 48 are thus in the nature of prisms.

Turning now to Figures 1 and 2, shaft 12 extends upwardly through the top wall of housing 10 and mounts a bevel gear 50 that is engaged by a bevel gear 52 on shaft 54. Shaft 54 is rotatably supported on the housing by the brackets 56 and 58 and rearwardly of the housing is connected by a universal joint 60 with a drive shaft 62 that extends rearwardly and is carried through a second universal joint 64 with a pulley or sprocket 66 adapted for being driven by the driving element 68 with a power take-off of the mower.

The tractor 70, which supports the mower, has a bracket 72 pivoted thereto, the lower end of which engages the arms 74 that engage the shaft 54 in the region of the brackets 56 and 58. Link means 76, (Figure 2) connected with the bracket 74, lead to a manually adjustable lever 78, by means of which the mower can be bodily raised and lowered to adjust its height relative to the ground. For tilting the mower upwardly so that it can be carried or transported, a cable or link 80 is provided leading to the casing of the mower as at 82 and having its other end connected with the manually adjustable lever 84. These adjustments provide for complete flexibility of the mower so that it can be raised vertically for transporting, or can be carried parallel with the ground at any suitable height thereabove for mowing operations.

The mower runs so that the cutting elements that are projecting through the front wall of the housing move rightwardly toward the tractor so that a shearing action is obtained between the right-hand edges of the cutting elements, as viewed in Figures 1, 2 and 3, and the left-hand edge of the members 48.

As will be noted in Figures 1 and 4, the members 48 occur at a spacing different from the spacing of the cutting elements 32, and because of this the cutting action is of a progressive nature, with only certain ones of the cutting elements being under a cutting load at any one time.

As will be observed in Figure 3, the cutting off of vegetation 90 occurs between the upper right-hand edge of each cutting element 32 and the lower left-hand corner of members 48 with which the cutting element is cooperating.

Because of this the upper loose ends of the sheared-off vegetation fall freely away from the mower while the stubble ends of the vegetation, which are beneath the cutting elements, are pulled from the mower because of their attachment to the ground. In this manner there is very little, if any, of the vegetation to be dragged along with the cutting elements and lodged between the cutting elements and the plates 46 and the members 48. In case vegetation is drawn into the space, the fact that the cutting elements move continuously in the same direction will carry the vegetation on through so that it will drop out the other side, whereby the mower is maintained for free running at all times.

It will be noted that the cutting elements 32 have their opposite edges bevelled so as to be parallel (Figure 8) and thus are reversible so that at any time one edge becomes dull the cutting element can be restored to its original efficiency merely by inverting it on the chain.

Figure 9:
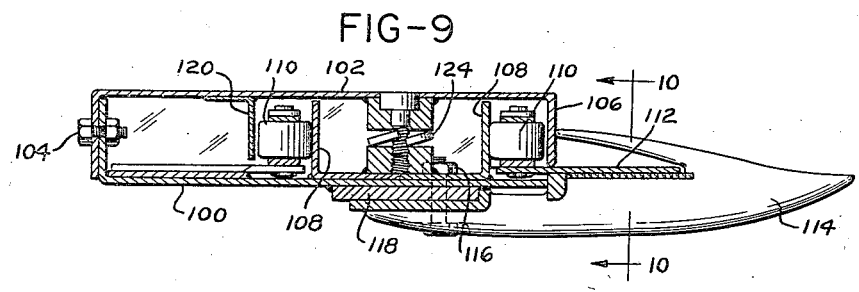
Figure 9 is an elevational view with parts broken away and shown in section of the structure of Figure 8.
Figure 10:
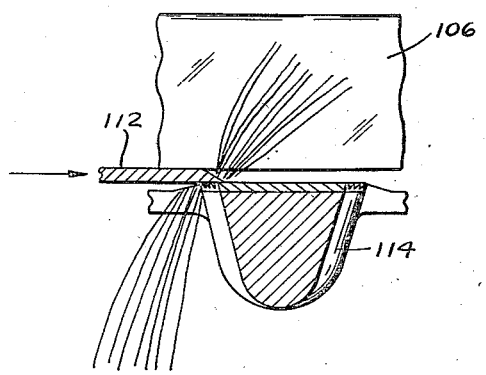
Figure 10 is a sectional view taken substantially on line 10—10 of Figure 9.

Figures 8, 9 and 10 show a modified construction wherein a conventional cutting action obtains to the extent that the cutting elements cut at their lower edges against a standard plate or shoe, such as is employed with the usual type reciprocating sickle bar mower.

In Figures 8 and 9 it will be seen that the arrangement comprises a housing having a lower part 100 and an upper part 102, with the parts having vertical flanges at their rear edges thereof and secured together by bolt means 104. The front edge of the upper housing part 102 is turned down as at 106, and mounted on the upper side of the lower housing part 100 is a channel member or a channel formed of two angle members, as indicated at 108.

The space between the front wall of the channel member 108 and the downturned front wall 106 of the upper housing part forms a track in which the front reach 110 of the chain runs, and to which chain are attached the cutting elements 112 corresponding to the cutting elements previously referred to except that the leading edges of the cutting elements 112 are sharp at their lower edges rather than at their upper edges. The cutting elements run in the standard shoes 114 which are fixed to the bottom of the mower arrangement by the bolt means 116 passing through the lower housing portion. Spacer blocks 118 may be employed to fit in the recess formed in the rear edges of the conventional shoes.

The upper housing part 102 has a dependent angle 120 therein which forms, together with the back portion of the angle member 108, the track within which the rear reach of the chain runs.

The two housing parts are secured together forwardly of their rear edges by the cap screws 122, the heads of which are disposed in internal bosses mounted on the upper housing part and the lower of which thread into internal bosses on the lower housing part. These bosses are normally spaced apart and spring washers 124 are disposed therebetween. This arrangement provides for tightening the cap screws 122 in order to bring the lower edge of the turned-down portion 106 down to the point where it has the proper minimum amount of clearance above the cutter elements 112 as the device is used and some wear takes place in it.

It will also be observed that a mower constructed according to the present invention is relatively safe in that there are no wide spaces that are open through which the cutting elements move. The cutting edges are well protected and the hazard of utilizing the mower of the present invention is thus substantially less than occurs with conventional mowers.

It will also be evident that, since the mower of this invention always runs in the same direction, it can be operated at high speed without creating extreme vibration.

Further, since it is not necessary to accelerate the cutter continuously and since the cutting action is progressive and distributed, substantially less power is required to operate the mower and considerably less than is utilized with conventional mowers of corresponding size.

Also, since a conventional chain of standard manufacture can serve as a carrying member for the cutting elements, it will be evident that repair of the mower is quite simple and inexpensive at any time.

It will be understood that this invention is susceptible to modification in order to adapt it to different usages and conditions and, accordingly, it is desired to comprehend such modifications within this invention as may fall within the scope of the appended claims.

I claim:

1. In a mower; a frame having a straight side wall with a slot therein, a chain loop supported in the frame with one reach thereof parallel to said wall adjacent said slot, cutting elements on the chain projecting through said slot having their upper leading edges sharpened, and members mounted on the outside of said wall above the slot having edges at the bottom adapted and arranged for shearing cooperation with the sharpened edges of the cutting elements, said cutting elements being the general shape of isosceles triangles, and the edges of the said members cooperating with the cutting elements being substantially perpendicular to said wall.

2. In a mover; a frame having a straight side wall with a slot therein, a chain loop supported in the frame with one reach thereof parallel to said one wall adjacent said slot, cutting elements on the chain projecting through said slot having their upper leading edges sharpened, and members mounted on the outside of said one wall above the slot having edges at the bottom adapted and arranged for shearing cooperation with the sharpened edges of the cutting elements, said cutting elements being the general shape of isosceles triangles, and said members being in the form of prisms with the face having the edge at the bottom that cooperates with the cutting elements perpendicular to said one wall and the face on the other side being inclined to the said wall with the members being pointed in front.

3. In a mower; a chain loop running in a horizontal plane, spaced support means engaging the chain with at least one thereof being a driven sprocket, triangular cutting elements detachably mounted on the chain on one side thereof and projecting horizontally outwardly from the chain, each cutting element having its upper leading edge and its trailing lower edge sharpened so as to be reversible on the chain, a frame enclosing said chain and having slot means extending along one wall through which said cutting elements project, members projecting outwardly along said one wall above said slot for shearing cooperation with the upper leading edges of said cutting elements, and guard elements vertically aligned with said members projecting outwardly from one said wall beneath said slot.

4. In a mower; a roller chain loop running in a horizontal plane, spaced rotatable support means engaging the chain with at least one thereof being a driven sprocket, horizontal bar members arranged between said support means and engaging the rollers of said chain between the top and bottom edges thereof to support the chain during its travel between said support means, cutting elements detachably mounted on the chain and projecting horizontally outwardly therefrom, a frame enclosing said chain and supporting said support means and bar members and having one wall parallel with said bar members and being formed with a slot through which said cutting elements project, and members mounted on said one wall adjacent said slot cooperating with said elements in cutting relation.

5. In a mower; a chain loop running in a horizontal plane, spaced rotatable support means engaging the chain with at least one of said support means comprising a driven sprocket, bars arranged between said support means and engaging the inside surfaces of the reaches of said chain loop between the top and bottom edges of the chain to thereby support the said chain, triangular cutting elements detachably mounted on the chain and projecting horizontally therefrom, a frame enclosing said chain and supporting said support means and bars and having one wall provided with a slot through which said cutting elements project, said one wall being provided with members projecting therefrom above the slot for cooperating with said cutting elements in shearing relation when the chain is driven, the said bar engaging the inside of the chain on the side opposite said one wall having one end tapered inwardly away from the chain, and an idler member mounted on said frame and engaging the outside of said chain in the region between the said tapered portion of the said bar and the adjacent one of said support means, said idler member being adjustable laterally of the chain for adjusting the tension on said chain.

6. In a mower; an elongated inverted pan like frame, means extending longitudinally along the inside of the frame forming back up rails for reaches of a chain loop, a chain loop in said frame engaging said rails, support means in the frame supporting opposite ends of chain loop and one of said means being a driven sprocket, cutting elements carried on the bottom of said chain and projecting horizontally outwardly therefrom, one wall of said frame having a slot and the said cutting elements extending through said slot, stationary prism shaped members attached to the wall of said frame above said slot for cooperating with said cutting elements for shearing vegetation, and means closing the bottom of said frame and including plate elements extending outwardly on the opposite side of said cutting elements from said prism members and in vertical registration with said members.

7. In a mower; an elongated inverted pan like frame, means extending longitudinally along the inside of the frame forming back up rails for reaches of a chain loop, a chain loop in said frame engaging said rails, support means in the frame supporting opposite ends of chain loop and one of said means being a driven sprocket, cutting elements carried on the bottom of said chain and projecting horizontally outwardly therefrom, one wall of said frame having a slot and the said cutting elements extending through said slot, stationary prism shaped members attached to the wall of said frame above said slot for cooperating with said cutting elements for shearing vegetation, and means closing the bottom of said frame and including plate elements extending outwardly on the opposite side of said cutting elements from said prism members and in vertical registration with said members, said prism shaped members being arranged in uniformly spaced relation different from the spacing between said cutting elements whereby a limited number of the cutting elements are working at any one time.

References Cited in the file of this patent

UNITED STATES PATENTS

| 22,824 | Persons et al. | Feb. 1, 1859 |
| 78,515 | Christy | June 2, 1868 |
| 104,773 | Rogers | June 28, 1870 |
| 334,304 | Sweeney et al. | Jan. 12, 1886 |
| 441,337 | Smith | Nov. 25, 1890 |
| 471,560 | Lydon et al. | Mar. 29, 1892 |
| 671,085 | Knowles | Apr. 2, 1901 |
| 673,389 | Denton | May 7, 1901 |
| 1,124,124 | Freeman | Jan. 5, 1915 |
| 1,145,739 | Bartges | July 6, 1915 |
| 1,532,279 | Ullom | Apr. 7, 1925 |